United States Patent
Marutani et al.

(10) Patent No.: US 9,027,764 B2
(45) Date of Patent: May 12, 2015

(54) MOISTURE-PERMEABLE SEPARATING MEMBRANE MATERIAL

(75) Inventors: Kazuhiro Marutani, Tokyo (JP); Satoshi Yamamoto, Tokyo (JP); Takashi Imai, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 888 days.

(21) Appl. No.: 13/256,671

(22) PCT Filed: Mar. 1, 2010

(86) PCT No.: PCT/JP2010/053230
§ 371 (c)(1),
(2), (4) Date: Dec. 8, 2011

(87) PCT Pub. No.: WO2010/106900
PCT Pub. Date: Sep. 23, 2010

(65) Prior Publication Data
US 2012/0067812 A1 Mar. 22, 2012

(30) Foreign Application Priority Data

Mar. 17, 2009 (JP) .................................. 2009-064473

(51) Int. Cl.
| | | |
|---|---|---|
| *B01D 39/00* | (2006.01) | |
| *B01D 69/02* | (2006.01) | |
| *B01D 69/10* | (2006.01) | |
| *B01D 69/12* | (2006.01) | |
| *B01D 71/54* | (2006.01) | |
| *B32B 27/12* | (2006.01) | |
| *B32B 27/32* | (2006.01) | |
| *B32B 27/40* | (2006.01) | |
| *B01D 71/36* | (2006.01) | |
| *F28D 21/00* | (2006.01) | |
| *F28F 21/06* | (2006.01) | |

(52) U.S. Cl.
CPC ............... *B01D 69/02* (2013.01); *B01D 69/10* (2013.01); *B01D 69/12* (2013.01); *B01D 71/36* (2013.01); *B01D 71/54* (2013.01); *B01D 2325/40* (2013.01); *F28D 21/0015* (2013.01); *F28F 21/06* (2013.01); *B32B 27/12* (2013.01); *B32B 27/322* (2013.01); *B32B 27/40* (2013.01); *B32B 2307/3065* (2013.01); *B32B 2307/718* (2013.01); *B32B 2307/724* (2013.01)

(58) Field of Classification Search
CPC ........ B01D 69/10; B01D 69/12; B01D 71/36; B01D 71/54
USPC .................. 210/490, 500.36, 500.27, 500.42; 428/315.9, 96; 442/59; 427/240
See application file for complete search history.

(56) References Cited

U.S. PATENT DOCUMENTS

| | | | |
|---|---|---|---|
| 4,065,410 A | 12/1977 | Schiifer et al. | |
| 6,242,555 B1 | 6/2001 | DuPrez et al. | |
| 7,211,293 B2 * | 5/2007 | Piana et al. | 427/240 |
| 2003/0193045 A1 * | 10/2003 | Takeuchi et al. | 252/601 |
| 2005/0079781 A1 * | 4/2005 | Tsujimoto et al. | 442/59 |
| 2006/0090650 A1 * | 5/2006 | Yamakawa et al. | 96/11 |
| 2007/0231531 A1 * | 10/2007 | Piana et al. | 428/96 |
| 2009/0324929 A1 * | 12/2009 | Yamakawa et al. | 428/315.9 |
| 2010/0173084 A1 * | 7/2010 | Piana et al. | 427/379 |
| 2011/0076494 A1 * | 3/2011 | Gunzel et al. | 428/355 R |
| 2012/0067812 A1 * | 3/2012 | Muratani et al. | 210/490 |

FOREIGN PATENT DOCUMENTS

| | | |
|---|---|---|
| CN | 1421473 | 6/2003 |
| CN | 1575309 | 2/2005 |
| EP | 0659792 | 6/1998 |
| JP | 7-133994 | 5/1995 |
| JP | 2006-150323 | 6/2006 |
| JP | 2007-64508 | 3/2007 |

OTHER PUBLICATIONS

International Search Report from PCT/JP2010/053230 (1 page), Published on May 25, 2010.

* cited by examiner

*Primary Examiner* — Ana Fortuna
(74) *Attorney, Agent, or Firm* — Amy L. Miller

(57) ABSTRACT

A moisture-permeable separating membrane material includes a porous fluororesin membrane, a continuous moisture-permeable resin layer formed on the surface of the porous fluororesin membrane, and a textile layer for reinforcing the porous fluororesin membrane and the continuous moisture-permeable resin layer. The textile layer contains a flame retardant in the inside of each fiber and the surface of each fiber has been treated with a flame retardant. The moisture-permeable separating membrane material makes it possible to improve flame retardancy without deteriorating heat exchange characteristics.

21 Claims, No Drawings

MOISTURE-PERMEABLE SEPARATING MEMBRANE MATERIAL

TECHNICAL FIELD

The present invention relates to a moisture-permeable separating membrane material, which is useful as a heat exchange membrane, a humidification membrane, a dehumidification membrane, a pervaporation membrane [i.e., a membrane for separating, for example, water and another liquid (e.g., ethanol) from each other], or other membranes (particularly as a heat exchange membrane).

BACKGROUND ART

A heat exchange membrane is used for, for example, an air-conditioning system, and can allow heat exchange without mixing indoor air and outdoor air with each other. In recent years, a total heat exchange membrane is used that can exchange not only sensible heat but also latent heat (humidity). A heat exchanger is often installed inside structures, such as buildings, factories, and houses, and therefore, the heat exchange membrane is also required to have flameproofness and flame retardancy for fire prevention.

As a total heat exchange membrane, for example, a heat exchange membrane formed of paper is adopted, and the paper heat exchange membrane is impregnated with a hydrophilic flame retardant. The paper heat exchange membrane, however, has a low water resistance. For example, condensation water may become attached to the heat exchange membrane, depending on the use conditions of the heat exchanger. If the condensation water is frozen, the paper heat exchange membrane may be torn. Further, the condensation water causes the elution of the flame retardant, and therefore, the flame retardancy and the latent heat exchange performance are deteriorated.

To prevent a tear caused by condensation water, there has been proposed to use a layered product, in which a continuous layer of a moisture-permeable resin is formed on the surface of a porous fluororesin membrane, as a total heat exchange membrane (Patent Documents 1 and 2). The layered product is usually reinforced with a nonwoven fabric or other materials. Further, to improve the flame retardancy of the layered product, Patent Document 2 also discloses blending a flame retardant into the moisture-permeable resin layer.

Meanwhile, there has been disclosed that in a dust removal filter composed of an electrofilter and a flame-retardant nonwoven fabric, a flame retardant is blended also into an adhesive by which the electrofilter and the flame-retardant nonwoven fabric are attached to each other (Patent Document 3). The dust removal filter has air permeability, but a conventional moisture-permeable separating membrane material does not have air permeability; therefore, these materials belong to technical fields that are quite different in whether each of them has air permeability or not.

PRIOR ART DOCUMENTS

Patent Documents

Patent Document 1: Japanese Patent Laid-open Publication No. Hei 7-133994
Patent Document 2: Japanese Patent Laid-open Publication No. 2006-150323
Patent Document 3: Japanese Patent Laid-open Publication No. 2002-292214

DISCLOSURE OF THE INVENTION

Problems to be Solved by the Invention

It is an object of the present invention to improve the flame retardancy of a total heat exchange membrane composed of a porous fluororesin membrane, a continuous moisture-permeable resin layer, and a reinforcing textile layer (a reinforcing fiber layer), without deteriorating the total heat exchange properties of the total heat exchange membrane (preferably to achieve a level of flame retardancy corresponding to flame retardancy grade 2 or higher as defined in JIS Z 2150).

Means of Solving the Problems

To improve the flame retardancy of a total heat exchange membrane composed of a porous fluororesin membrane, a continuous moisture-permeable resin layer, and a reinforcing textile layer, it is considered best to blend a flame retardant into the continuous moisture-permeable resin layer, as shown in Patent Document 2. Further, it is considered best to blend a flame retardant also into the textile layer. A fluororesin is intrinsically an incombustible material, and therefore, it is considered that the flame retardancy can be improved by flame retarding each of the other layers (i.e., the continuous moisture-permeable resin layer and the textile layer) to be combined with the fluororesin. Patent Document 3 also discloses improving the flame retardancy of a layered product by flame retarding both a nonwoven fabric and an adhesive layer to be stacked on the nonwoven fabric.

However, the present inventors have studied to find that when all the layers are flame retarded, the moisture permeability of the total heat exchange membrane becomes decreased. As a flame retardant, there have been known, for example, liquid flame retardants and powdered flame retardants, and other flame retardants are also known that become resinous after being dissolved in water or an organic solvent and then dried. These flame retardants can be mixed into the moisture-permeable resin; however, liquid flame retardants may have problems, such as bleeding out during use and causing stickiness, and powdered flame retardants and resinous flame retardants may deteriorate moisture permeability. In response to this, after further studies, the present inventors have found that flame retardancy can be improved without deteriorating moisture permeability, by allowing a flame retardant to be contained in the inside of each fiber forming the textile layer and also treating the surface of each fiber forming the textile layer with a flame retardant, while substantially not blending a flame retardant into the continuous moisture-permeable resin layer; and thereby the present inventors have completed the present invention.

That is, the moisture-permeable separating membrane material according to the present invention comprises a porous fluororesin membrane (particularly a porous polytetrafluoroethylene membrane), a continuous moisture-permeable resin layer formed on the surface of the porous fluororesin membrane, and a textile layer for reinforcing the porous fluororesin membrane and the continuous moisture-permeable resin layer, wherein the textile layer contains a flame retardant in the inside of each fiber therein and the surface of each fiber therein has been treated with a flame retardant. The textile layer has desirably been stacked on the side of the continuous moisture-permeable resin layer in the porous fluororesin membrane with the continuous moisture-permeable resin layer formed on the surface thereof. For example, the continuous moisture-permeable resin layer may have been stacked on the surface of the porous fluororesin membrane to, form a composite membrane and then the reinforcing textile layer may have been attached to the composite membrane on the side of the continuous moisture-permeable resin layer. As the flame retardant in the inside of each fiber and the flame retardant on the surface of each fiber, non-halogen type flame retardants (particularly non-halogen phosphorous type flame retardants) may preferably be used from the viewpoint of environmental burden reduction. The mass per unit area of the textile layer may be, for example, from 2 g/m² to 100 g/m². The amount of the flame retardant on the surface of each fiber per 1 m² of the textile layer may be, for example, from about 1 g to about 100 g. The thickness of part of the moisture-permeable resin, which part has penetrated into the inside of the porous fluororesin membrane, may preferably be from about 3 μm to about 30 μm. As the moisture-permeable resin, there may appropriately be used polyvinyl alcohol, polyethylene oxide, polyacrylic acid, polyurethane type resins, or other resins. The polyurethane type resin has at least one hydrophilic group selected from hydroxy group, amino group, carboxy group, sulfinic acid group, and oxyethylene group. The moisture-permeable separating membrane material according to the present invention may have, for example, an air permeability of 1,000 seconds or higher, a moisture permeability of 40 g/m².h or higher, and flame retardancy grade 2 or higher (JIS Z 2150).

Effects of the Invention

In the present invention, a continuous moisture-permeable resin layer is not flame retarded, but both the inside of each fiber and the surface of each fiber in the reinforcing textile layer to be stacked on the continuous moisture-permeable resin layer are flame retarded. This makes it possible to improve flame retardancy without deteriorating total heat exchange properties.

MODE FOR CARRYING OUT THE INVENTION

In a moisture-permeable separating membrane material, a continuous moisture-permeable resin layer works as a separating membrane having moisture permeability. When used alone, a continuous moisture-permeable resin layer, for example, greatly swells in a wet state and has a low strength, and therefore, the continuous moisture-permeable resin layer has difficulty in maintaining the shape of a thin membrane. Thus, a continuous moisture-permeable resin layer is used in the form of a composite with a porous fluororesin membrane. In the present description, a layered product composed of a porous fluororesin membrane and a continuous moisture-permeable resin layer is referred to as a "composite membrane". Further, a porous fluororesin membrane alone is not elastic and therefore has poor handling properties in the subsequent processes, and further, has insufficient strength. Thus, a porous fluororesin membrane is usually reinforced with a textile layer. The present invention will be described below, providing a detailed explanation of each layer.

1) Continuous Moisture-Permeable Resin Layer

For example, a membrane used as a total heat exchange membrane allows total heat (sensible heat and latent heat) exchange, but needs to prevent air (e.g., carbon dioxide gas) exchange. Accordingly, a continuous moisture-permeable resin layer is a nonporous membrane layer made of a moisture-permeable resin, and is formed on the surface of a porous fluororesin membrane. The moisture-permeable resin may have penetrated into part or all of the porous fluororesin. The present invention is characterized in that although the flame retarding of a moisture-permeable membrane separating material is an object of the present invention, the continuous moisture-permeable resin layer is substantially not flame retarded. If the continuous moisture-permeable resin layer substantially contains a flame retardant, the moisture permeability of the moisture-permeable separating membrane material is deteriorated. Although the details of the reason for this are not specified, it is considered as being because the flame retardant, if dispersed uniformly throughout the continuous moisture-permeable resin layer, may act as a moisture-permeability inhibitor.

Examples of the moisture-permeable resin may include water-soluble resins, such as polyvinyl alcohol, polyethylene oxide, and polyacrylic acid; and water-insoluble moisture-permeable resins, such as hydrophilic polyurethane.

A hydrophilic polyurethane type resin is characterized in that it has at least one hydrophilic group, such as hydroxyl group, amino group, carboxyl group, sulfonic acid group, and oxyethylene group, and it may be either polyether type polyurethane or polyester type polyurethane. Alternatively, prepolymers of these urethanes may appropriately be used. Further, to adjust the melting point (softening point) of the resin, the following may be used alone, or a mixture of the following may also be used, as a cross-linking agent: isocyanates each having two or more isocyanate groups (e.g., diisocyanates, triisocyanates); and adducts thereof. Further, for isocyanate-terminated prepolymers, the following may be used as a curing agent: bifunctional or higher functional polyols (e.g., diols, triols); and bifunctional or higher functional amines (e.g., diamines, triamines). To maintain high moisture permeability, bifunctional curing agents may be preferred.

A preferred hydrophilic polyurethane type resin is a resin having a hydrophilic main chain (e.g., product name "HYPOL" available from the Dow Chemical Company). This preferred hydrophilic polyurethane type resin is, for example, a reactive prepolymer having a polyether main chain (e.g., a main chain containing polyoxyethylene units) and being terminated with appropriate isocyanate groups (e.g., toluene diisocyanate groups). The prepolymer is cross-linked by water and a polyfunctional amine (e.g., a blocked carbamate amine).

The thickness of the continuous moisture-permeable resin layer is not particularly limited, so long as it can allow total heat exchange between gases separated by the continuous moisture-permeable resin layer, while preventing the gases from mixing with each other. The thickness of the continuous moisture-permeable resin layer may be, for example, from about 0.01 μm to about 100 μm. The continuous moisture-permeable resin layer, if too thin, may come to easily cause the formation of pinholes. The thickness of the continuous moisture-permeable resin layer may more preferably be 0.05 μm or greater, particularly 0.5 μm or greater. In contrast, the continuous moisture-permeable resin layer, if too thick, may come to easily have deteriorated moisture permeability. The thickness of the continuous moisture-permeable resin layer may more preferably be 50 μm or smaller, particularly 20 μm or smaller.

The continuous moisture-permeable resin layer may preferably have penetrated into the inside of the porous fluororesin membrane, because this makes it possible to prevent the detachment of the continuous moisture-permeable resin layer, thereby increasing durability. The thickness of part of the moisture-permeable resin, which part has penetrated into the inside of the porous fluororesin membrane, may preferably be from 3 to 30 μm, most preferably from 5 to 20 μm, from the viewpoints of moisture permeability and durability. When the continuous moisture-permeable resin layer has penetrated into the inside of the porous fluororesin membrane, the thickness of the continuous moisture-permeable resin layer includes the thickness of each penetrating part.

The thickness of the continuous moisture-permeable resin layer and the thickness of each penetrating part are values each calculated by measuring an area S of the corresponding portion (the continuous layer or each penetrating part) in a cross-sectional photograph taken with an electron microscope (from 1,000 to 3,000 fold), and dividing the area S by a length L of the corresponding portion, which length is determined based on the scale (tick marks representing lengths) of the electron microscope photograph.

The continuous moisture-permeable resin layer may further contain a moisture absorbent. The continuous moisture-permeable resin layer can have water retention capacity improved by the moisture absorbent and can therefore have further improved moisture permeability. As the moisture absorbent, there can be used water-soluble salts (e.g., lithium salts, phosphate salts).

2) Porous Fluororesin Membrane

The porous fluororesin membrane functions as a layer for holing the continuous moisture-permeable resin layer. Further, the fluororesin per se is not combustible, and therefore, it contributes to the flame retarding of the moisture-permeable separating membrane material.

A preferred porous fluororesin membrane is a porous polytetrafluoroethylene (PTFE) membrane. The porous PTFE membrane is obtained by mixing PTFE fine powder with a forming aid to give a paste, forming the paste into a formed product, removing the forming aid from the formed product, and then expanding the formed product at a high temperature and a high rate, and further, if necessary, baking the expanded product. The details are described in the Japanese Patent Publication No. Sho 51-18991. The expanding may be either uniaxially expanding or biaxially expanding. A uniaxially expanded porous PTFE membrane is microscopically characterized in that it has nodes (folded crystals) arranged in a thin-island manner approximately perpendicularly to the expanding direction and also has fibrils (linear molecule bundles in which folded crystals have been unraveled and pulled out by the expanding) oriented in a reed-screen manner along the expanding direction so as to connect the nodes to one another. On the other hand, a biaxially expanded porous PTFE membrane is microscopically characterized in that it has fibrils extending in a radial manner and also has fibril-connecting nodes interspersed in an island manner, resulting in a spider's web-like fibrous structure in which there are many spaces defined by both the fibrils and the nodes. A biaxially expanded porous PTFE membrane is particularly preferably used, because it is easier to make wide, has excellent balance of physical properties between in the longitudinal direction and in the transverse direction, and has low production cost per unit area, as compared with a uniaxially expanded porous PTFE membrane.

The average pore diameter of the porous fluororesin membrane may be, for example, from about 0.07 µm to about 10 µm. If the average pore diameter is too small, the moisture permeability of the porous fluororesin membrane may be deteriorated. The average pore diameter of the porous fluororesin membrane may more preferably be 0.09 µm or greater. In contrast, if the average pore diameter is too large, the continuous moisture-permeable resin layer may easily penetrate-into the porous fluororesin membrane. This results in the thickening of filled portions (non-space portions) of the moisture-permeable resin layer to increase the traveling time of moisture, thereby deteriorating moisture permeability. The average pore diameter of the porous fluororesin membrane may more preferably be 5 µm or smaller. The average pore diameter of the porous fluororesin membrane means the average value of pore diameters as measured using a Coulter Porometer available from Coulter Electronics Ltd. The average pore diameter of an expanded porous PTFE membrane can appropriately be controlled by the expansion ratio and other factors.

The porosity of the porous fluororesin membrane can appropriately be set depending on the average pore diameter described above, and it is recommended that the porosity of the porous fluororesin membrane should be, for example, not smaller than about 30% (preferably not smaller than about 50%) and not greater than about 98% (preferably not greater than about 90%). The porosity of the expanded porous PTFE membrane can appropriately be adjusted by the stretch ratio and other factors, similarly to the average pore diameter described above.

The porosity of the porous fluororesin membrane can be calculated, based on the following formula, using a bulk density D determined by measuring a mass W and a hole-including apparent volume V of the porous fluororesin membrane (D=W/V in g/cm$^3$), and a density $D_{standard}$ (2.2 g/cm$^3$ in the case of PTFE resin) when no holes are formed. The thickness used to calculate the volume V is determined, based on the average thickness measured with a dial thickness gauge (the measurements of the average thickness were carried out using "SM-1201" available from Teclock Corporation in the state where no load is applied other than the spring load of the gauge body).

Porosity (%)=[1−($D/D_{standard}$)]×100

The thickness of the porous fluororesin membrane, although it is not particularly limited, may be, for example, about 200 µm or smaller, preferably about 100 µm or smaller, and more preferably about 60 µm or smaller. If the porous fluororesin membrane is too thick, the moisture permeation performance of the moisture-permeable separating membrane material may be deteriorated. However, if the porous fluororesin membrane is too thin, workability may be impaired. Thus, the thickness of the porous fluororesin membrane may be set to be, for example, 0.1 µm or greater, preferably 3 µm or greater, and more preferably 5 µm or greater.

3) Reinforcing Textile layer

To increase the handling properties and the strength of the composite membrane (the porous fluororesin membrane and the continuous moisture-permeable resin layer), a reinforcing textile layer is stacked on the composite membrane. The reinforcing textile layer may be stacked on the porous fluororesin membrane side of the composite membrane, or may be stacked on the continuous moisture-permeable resin continuous layer side of the composite membrane. The reinforcing textile layer may preferably be stacked on the moisture-permeable resin continuous layer side, in which case the continuous moisture-permeable resin layer can be prevented from being damaged.

The present invention is characterized in that both the inside of each fiber and the surface of each fiber in the reinforcing textile layer are flame retarded. When both the inside of each fiber and the surface of each fiber in the reinforcing textile layer are flame retarded and the reinforcing textile layer is combined with a noncombustible porous fluororesin membrane, even if the continuous moisture-permeable resin layer to be stacked between them is substantially not flame retarded, the flame retardancy of the moisture-permeable separating membrane material can be improved.

To flame retard the inside of each fiber, the inside of each fiber may be allowed to contain a flame retardant. For example, fibers may be mixed (particularly impregnated) with a flame retardant, or, when resin fibers are produced, a flame retardant may be bound to (particularly copolymerized with) the resin. As the fiber, of which inside has been flame retarded, for example, spunbonded nonwoven fabrics are commercially available. Examples of such commercially available nonwoven fabrics may include "HEIM (registered trademark)" available from Toyobo Co., Ltd., and "ELTAS FR (registered trademark)" available from Asahi Kasei Fibers Corporation.

On the other hand, to flame retard the surface of each fiber, fibers may be coated with a liquid in which a flame retardant is dispersed (or dissolved) in an appropriate solvent. The coating amount per 1 m$^2$ of the reinforcing textile layer may be, for example, 1 g or greater, preferably 3 g or greater, and more preferably 6 g or greater. The upper limit of the coating amount is not particularly limited. However, if the coating amount is too great, the flame retardant may form a nonporous membrane layer and therefore inhibit moisture permeability. The coating amount per 1 m$^2$ of the reinforcing textile layer may be, for example, about 100 g or smaller, preferably about 50 g or smaller, and more preferably about 20 g or smaller. The coating method, although it is not particularly limited, may be the immersion of fibers in a flame retardant-containing liquid, or may appropriately be the employment of a known coating method, such as dip coating, kiss coating, or spray coating.

Examples of the flame retardant that can be bound to the resin may include phosphorus type flame retardants (non-halogen phosphorus type flame retardants, such as phosphorus-containing polyols) and halogen type flame retardants (e.g., bromine-containing polyols, tetrachlorophthalic anhydride, tetrabromophthalic anhydride).

The flame retardant that can be mixed with the resin may preferably be a powdered flame retardant. The powdered flame retardant may preferably be used, because it bleeds little and has little stickiness. The flame retardant to be used for coating can be halogen type flame retardants or non-halogen type flame retardants. The non-halogen type flame retardants may preferably be phosphorus type flame retardants, examples of which may include organophosphorus type flame retardants, such as phosphate ester monomers and phosphate ester condensates; ammonium polyphosphate; and phosphazene type flame retardants. The properties of the phosphorus type flame retardants may depend on the material, and the phosphorus type flame retardants may exhibit different properties, such as liquid, powdered, and resinous, depending on the phosphorus content and the compound structure. Examples of the liquid flame retardants may include alicyclic phosphonate esters and may also include those which contain powdered flame retardants dispersed in water by allowing them in coexistence with a surfactant. Some of these powdered flame retardants may have no melting point (may be decomposed) at 70° C. or higher. Such a flame retardant is coated with a dispersant and then dried at a temperature higher than the melting point. Thus, the flame retardant is melted and attached to a base material. The flame retardants having no melting point may be coating treated by the combined use of a binder resin.

Preferred flame retardants in the flame retardants described above are non-halogen type flame retardants, and particularly preferred flame retardants are non-halogen phosphorus type flame retardants. The non-halogen flame retardants can reduce environmental burdens.

The reinforcing textile layer is not particularly limited, so long as it is included in various fabric materials formed of fibers. The reinforcing textile layer, although it may be any of, for example, woven fabrics, knitted fabrics, braided fabrics, and nonwoven fabrics, may preferably be fabrics having excellent shape maintainability (e.g., woven fabrics, nonwoven fabrics, particularly nonwoven fabrics).

For nonwoven fabrics, there can appropriately be utilized, for example, direct spinning (e.g., spunbonding, melt blowing, flash spinning) or web forming using short fibers (e.g., chemical bonding, thermal bonding). Preferred nonwoven fabrics are spunbonded nonwoven fabrics and thermally-bonded nonwoven fabrics.

The mass per unit area of the reinforcing textile layer may be, for example, from about 2 g/m$^2$ to about 100 g/m$^2$, preferably from about 5 g/m$^2$ to about 50 g/m$^2$, and more preferably about 8 g/m$^2$ to about 40 g/m$^2$. Higher mass per unit area provides improved flame retardancy. In contrast, lower mass per unit area provides improved total heat exchange rate.

The thickness of the reinforcing textile layer may be, for example, from about 0.01 mm to about 1 mm, preferably from about 0.03 mm to about 0.5 mm, and more preferably from about 0.05 mm to 0.3 mm.

The method of stacking the continuous moisture-permeable resin layer, the porous fluororesin membrane, and the reinforcing textile layer, although it is not particularly limited, may be, for example, stacking the continuous moisture-permeable resin layer on the surface of the porous fluororesin membrane by application or other means to form a composite membrane and then attaching (e.g., attaching with an adhesive, heat bonding) the reinforcing textile layer to the composite membrane. Alternatively, the porous fluororesin membrane and the reinforcing textile layer may be attached to each other (e.g., by attaching with an adhesive, heat bonding), after which a moisture permeable resin-containing liquid is supplied to the surface of the porous fluororesin membrane to form the continuous moisture-permeable resin layer.

In the moisture-permeable separating membrane material of the present invention, which is obtained as described above, the continuous moisture-permeable resin layer is not flame retarded, but both the inside of each fiber and the surface of each fiber in the reinforcing textile layer to be stacked on the continuous moisture-permeable resin layer are flame retarded. Thus, the moisture-permeable separating membrane material of the present invention has excellent total heat exchange properties and also has excellent flame retardancy.

The air permeability of the moisture-permeable separating membrane material may be, for example, 1,000 seconds or greater, preferably 2,000 seconds or greater, and more preferably 3,000 seconds or greater.

The moisture permeability of the moisture-permeable separating membrane material may be, for example, about 40 g/m$^2$.h or greater, preferably about 50 g/m$^2$.h or greater, and more preferably about 70 g/m$^2$.h or greater. The moisture permeability of the moisture-permeable separating membrane material, although the upper limit thereof is not particularly limited, may be, for example, about 200 g/m$^2$.h or smaller, particularly about 120 g/m$^2$.h or smaller.

The flame retardancy grade (JIS Z 2150) of the moisture-permeable separating membrane material may be, for example, grade 2 or higher, preferably grade 1.

EXAMPLES

The present invention will be described below more specifically by reference to examples, but the present invention is not limited to the following examples. The present invention can be put into practice after appropriate modifications or variations within a range meeting the gist described above and below, all of which are included in the technical scope of the present invention.

Experimental Examples 1A to 1F

A hydrophilic polyurethane resin ("HYPOL 2000" available from the Dow Chemical Company) was applied to one side of an expanded porous PTFE membrane having a thickness of 20 μm, a porosity of 85%, and an average pore diameter of 0.2 μm, followed by drying, to form a continuous moisture-permeable resin layer having a thickness of 10 μm on one side of the PTFE membrane (to obtain composite membrane 1). The continuous moisture-permeable resin layer had partially penetrated into the PTFE membrane, and the thickness of each penetrating part was from about 5 μm to about 8 μm.

A phosphorus type flame retardant available from Nicca Chemical Co., Ltd. (product name "NICCA FI-NONE") was dissolved in water to have concentrations shown in Table 1. A spunbonded nonwoven fabric (HEIM (registered trademark) H3301 (having a mass per unit area of 30 g/m² and a thickness of 0.18 mm) available from Toyobo Co., Ltd.) was immersed in an aqueous solution of the phosphorus type flame retardant, wherein the spunbonded nonwoven fabric was made of polyester fibers copolymerized with a phosphorus type flame retardant, and then dehydrated by a mangle (rollers) for drying (to obtain surface flame-retarded nonwoven fabrics 1A to 1F). The coating amounts of the flame retardant were as shown below in Table 1.

The surface flame-retarded nonwoven fabrics 1 were each stacked on the continuous moisture-permeable resin (hydrophilic polyurethane resin) layer side of the composite membrane 1 with an adhesive (to obtain moisture-permeable separating membrane materials 1A to 1F).

Experimental Examples 2A to 2F

A process similar to that of Experimental Examples 1A to 1F was carried out, except that HEIM (registered trademark) H3201 (having a mass per unit area of 20 g/m² and a thickness of 0.12 mm) available from Toyobo Co., Ltd. was used as a spunbonded nonwoven fabric made of polyester fibers copolymerized with a phosphorus type flame retardant (to obtain moisture-permeable separating membrane materials 2A to 2F).

Experimental Examples 3A to 3C

A process similar to that of Experimental Examples 2A to 2F was carried out, except that a phosphorus type flame retardant available from Sanyo Chemical Industries, Ltd. (product name "FIRETARD") was used in place of the phosphorus type flame retardant available from Nicca Chemical Co., Ltd. (product name "NICCA FI-NONE") (to obtain moisture-permeable separating membrane materials 3A to 3C).

Experimental Examples 4A to 4D

A phosphorus type flame retardant (product name "NICCA FI-NONE" available from Nicca Chemical Co., Ltd.) was added in amounts shown in Table 4 to 100 parts by mass of a hydrophilic polyurethane resin ("HYPOL 2000" available from the Dow Chemical Company). The flame retardant-added resins were each applied to one side of an expanded porous PTFE membrane having a thickness of 20 μm, a porosity of 85%, and an average pore diameter of 0.2 μm, followed by drying, to form flame retardant-containing continuous moisture-permeable resin layers each having a thickness of 10 μm on one side of the corresponding PTFE membrane (to obtain composite membranes 4A to 4D). The continuous moisture-permeable resin layers had partially penetrated into the respective PTFE membranes, and the thickness of each penetrating part was from about 5 μm to about 8 μm.

A spunbonded nonwoven fabric (HEIM (registered trademark) H3201 (having a mass per unit area of 20 g/m² and a thickness of 0.12 mm) available from Toyobo Co., Ltd.) made of polyester fibers copolymerized with a phosphorus type flame retardant was stacked on each of the flame retardant-containing continuous moisture-permeable resin layer sides of the composite membranes 4 with an adhesive (to obtain moisture-permeable separating membrane materials 4A to 4D).

The moisture-permeable separating membrane materials obtained in the respective Experimental Examples each had an air permeability of 10,000 seconds or greater. Further, other physical properties were evaluated as follows:

(1) Moisture Permeability

The moisture permeability of each moisture-permeable separating membrane material was determined in accordance with JIS L 1099 (method A-1). The moisture permeability was measured in an environment at a temperature of 25° C. and a relative humidity of 75%.

(2) Initial Flame Retardancy

The flame retardancy of each moisture-permeable separating membrane material was determined in accordance with JIS Z 2150, method A (for a heating time of 10 seconds). The char length of each moisture-permeable separating membrane material after the test was determined and evaluated on the following criteria:

Pass (flame retardancy grade 1): the material has a char length of 50 mm or shorter;

Pass (flame retardancy grade 2): the material has a char length of longer than 50 mm and not longer than 100 mm; and Rejected: the material has a char length of longer than 100 mm.

(3) Flame Retardant Durability

The moisture-permeable separating membrane materials were immersed in warm water at 50° C. for 5 hours. After dried, the flame retardancy of each moisture-permeable separating membrane materials was determined in the same manner as described above in the item "(2) Initial Flame Retardancy."

The results are shown in Tables 1 to 4.

TABLE 1

| Experimental Example | | 1A | 1B | 1C | 1D | 1E | 1F |
|---|---|---|---|---|---|---|---|
| Concentration of aqueous flame retardant solution (% by mass) | | untreated | 20 | 25 | 30 | 35 | 40 |
| Coating amount of flame retardant (g/m²) | | 0 | 8.5 | 10.5 | 12.5 | 13.5 | 16 |
| Moisture permeability (g/m²·h) | | 80 | 77 | 79 | 79 | 78 | 77 |
| Initial flame retardancy | Decision of pass or rejected | rejected | pass | pass | pass | pass | pass |
| | Char length (mm) | ≥100 | 35 | 33 | 25 | 30 | 25 |
| Flame retardant durability | Decision of pass or rejected | rejected | pass | pass | pass | pass | pass |
| | Char length (mm) | ≥100 | 33 | 33 | 25 | 30 | 27 |

TABLE 2

| Experimental Example | | 2A | 2B | 2C | 2D | 2E | 2F |
|---|---|---|---|---|---|---|---|
| Concentration of aqueous flame retardant solution (% by mass) | | untreated | 20 | 25 | 30 | 35 | 40 |
| Coating amount of flame retardant (g/m$^2$) | | 0 | 6.3 | 7.5 | 8.5 | 9.7 | 11.0 |
| Moisture permeability (g/m$^2$·h) | | 92 | 95 | 93 | 94 | 93 | 92 |
| Initial flame retardancy | Decision of pass or rejected | rejected | pass | pass | pass | pass | pass |
| | Char length (mm) | ≥100 | 43 | 66 | 40 | 32 | 43 |
| Flame retardant durability | Decision of pass or rejected | rejected | rejected | pass | pass | pass | pass |
| | Char length (mm) | ≥100 | ≥100 | 90 | 40 | 35 | 40 |

TABLE 3

| Experimental Example | | 3A | 3B | 3D |
|---|---|---|---|---|
| Concentration of aqueous flame retardant solution (% by mass) | | untreated | 20 | 30 |
| Coating amount of flame retardant (g/m$^2$) | | 0 | 6 | 10 |
| Moisture permeability (g/m$^2$·h) | | 95 | 97 | 96 |
| Initial flame retardancy | Decision of pass or rejected | rejected | rejected | pass |
| | Char length (mm) | ≥100 | 80 | 30 |
| Flame retardant durability | Decision of pass or rejected | rejected | rejected | pass |
| | Char length (mm) | ≥100 | 90 | 35 |

TABLE 4

| Experimental Example | | 4A | 4B | 4C | 4D |
|---|---|---|---|---|---|
| Amount of flame retardant added (parts by mass) | | 0 | 20 | 40 | 50 |
| Moisture permeability (g/m$^2$·h) | | 92 | 60 | 46 | 38 |
| Initial flame retardancy | Decision of pass or failed | failed | failed | pass | pass |
| | Char length (mm) | ≥200 | 150 | 90 | 50 |

As shown in Experimental Examples 1B, 1C, 1D, 1E, 1F, 2B, 2C, 2D, 2E, 2F, 3B, and 3C, flame retardancy can be improved without deteriorating moisture permeability, when both the inside of each fiber and the surface of each fiber in the reinforcing textile layer are flame retarded, while a flame retardant is not added to the moisture-permeable resin. In contrast, as shown in Experimental Examples 4A to 4D, moisture permeability is decreasingly deteriorated, when a flame retardant is added to the moisture-permeable resin for improving flame retardancy.

Industrial Applicability

The moisture-permeable separating membrane material of the present invention can be utilized as a heat exchange membrane, a humidification membrane, a dehumidification membrane, a pervaporation membrane [i.e., a membrane for separating, for example, water and another liquid (e.g., ethanol) from each other], or other membranes (particularly as a heat exchange membrane).

The invention claimed is:

1. A moisture-permeable separating membrane material comprising a porous fluororesin membrane, a continuous moisture-permeable resin layer formed on the surface of the porous fluororesin membrane, and a textile layer for reinforcing the porous fluororesin membrane and the continuous moisture-permeable resin layer,
   wherein the textile layer comprises a multiplicity of fibers, each fiber of the multiplicity of fibers containing a first flame retardant in the inside of each fiber, and
   wherein the surface of each fiber of the multiplicity of fibers has been treated with a second flame retardant.

2. The moisture-permeable separating membrane material according to claim 1, wherein the textile layer has been stacked on the side of the continuous moisture-permeable resin layer in the porous fluororesin membrane with the continuous moisture-permeable resin layer formed on the surface thereof.

3. The moisture-permeable separating membrane material according claim 1, wherein the continuous moisture-permeable resin layer has been stacked on the surface of the porous fluororesin membrane to form a composite membrane and then the reinforcing textile layer has been attached to the composite membrane on the side of the continuous moisture-permeable resin layer.

4. The moisture-permeable separating membrane material according to claim 1, wherein the porous fluororesin membrane is a porous polytetrafluoroethylene membrane.

5. The moisture-permeable separating membrane material according to claim 1, wherein the first flame retardant and the second flame retardant are non-halogen type flame retardants.

6. The moisture-permeable separating membrane material according to claim 5, wherein the first flame retardant and the second flame retardant are phosphorus type flame retardants.

7. The moisture-permeable separating membrane material according to claim 1, wherein the amount of the second flame retardant on the surface of each fiber per 1 m$^2$ of the textile layer is from 1 g to 100 g.

8. The moisture-permeable separating membrane material according to claim 1, wherein the mass per unit area of the textile layer is from 2 g/m$^2$ to 100 g/m$^2$.

9. The moisture-permeable separating membrane material according to claim 1, wherein the thickness of part of the moisture-permeable resin, which part has penetrated into the inside of the porous fluororesin membrane, is from 3 μm to 30 μm.

10. The moisture-permeable separating membrane material according to claim 1, wherein the moisture-permeable resin is at least one resin selected from polyvinyl alcohol, polyethylene oxide, polyacrylic acid, and polyurethane type resins.

11. The moisture-permeable separating membrane material according to claim 1, wherein the moisture-permeable resin is a polyurethane type resin.

12. The moisture-permeable separating membrane material according to claim 11, wherein the polyurethane type resin has at least one hydrophilic group selected from hydroxy group, amino group, carboxy group, sulfinic acid group, and oxyethylene group.

13. The moisture-permeable separating membrane material according to claim 1, which has an air permeability of 1,000 seconds or higher, a moisture permeability of 40 g/m$^2$.h or higher, and flame retardancy grade 2 or higher (as measured according to JIS Z 2150).

14. The moisture-permeable separating membrane material according to claim 1, wherein each fiber of the multiplicity of fibers is mixed with the first flame retardant before formation of the moisture-permeable separating membrane.

15. The moisture-permeable separating membrane material according to claim 14, wherein the first flame retardant is in the form of a powder when each fiber of the multiplicity of fibers is mixed with the first flame retardant.

16. The moisture-permeable separating membrane material according to claim 1, wherein each fiber of the multiplicity of fibers is impregnated with the first flame retardant before formation of the moisture-permeable separating membrane.

17. The moisture-permeable separating membrane material according to claim 1, wherein each fiber of the multiplicity of fibers is formed from a resin, and the first flame retardant is bound to the resin during production of the resin fiber.

18. The moisture-permeable separating membrane material according to claim 1, wherein each fiber of the multiplicity of fibers is formed from a resin, and the first flame retardant is copolymerized with the resin during production of the resin fiber.

19. The moisture-permeable separating membrane material according to claim 1, wherein the first flame retardant and the second flame retardant are different.

20. The moisture-permeable separating membrane material according to claim 1, wherein the second flame retardant is in the form of a liquid.

21. The moisture-permeable separating membrane material according to claim 1, wherein the continuous moisture-permeable resin layer is substantially not flame retarded.

* * * * *